Sept. 21, 1926.
B. F. SCHMIDT
1,600,490
OVER RUNNING CLUTCH WITH INTERNAL SLIDING GEAR
Filed Jan. 24, 1920     3 Sheets-Sheet 1
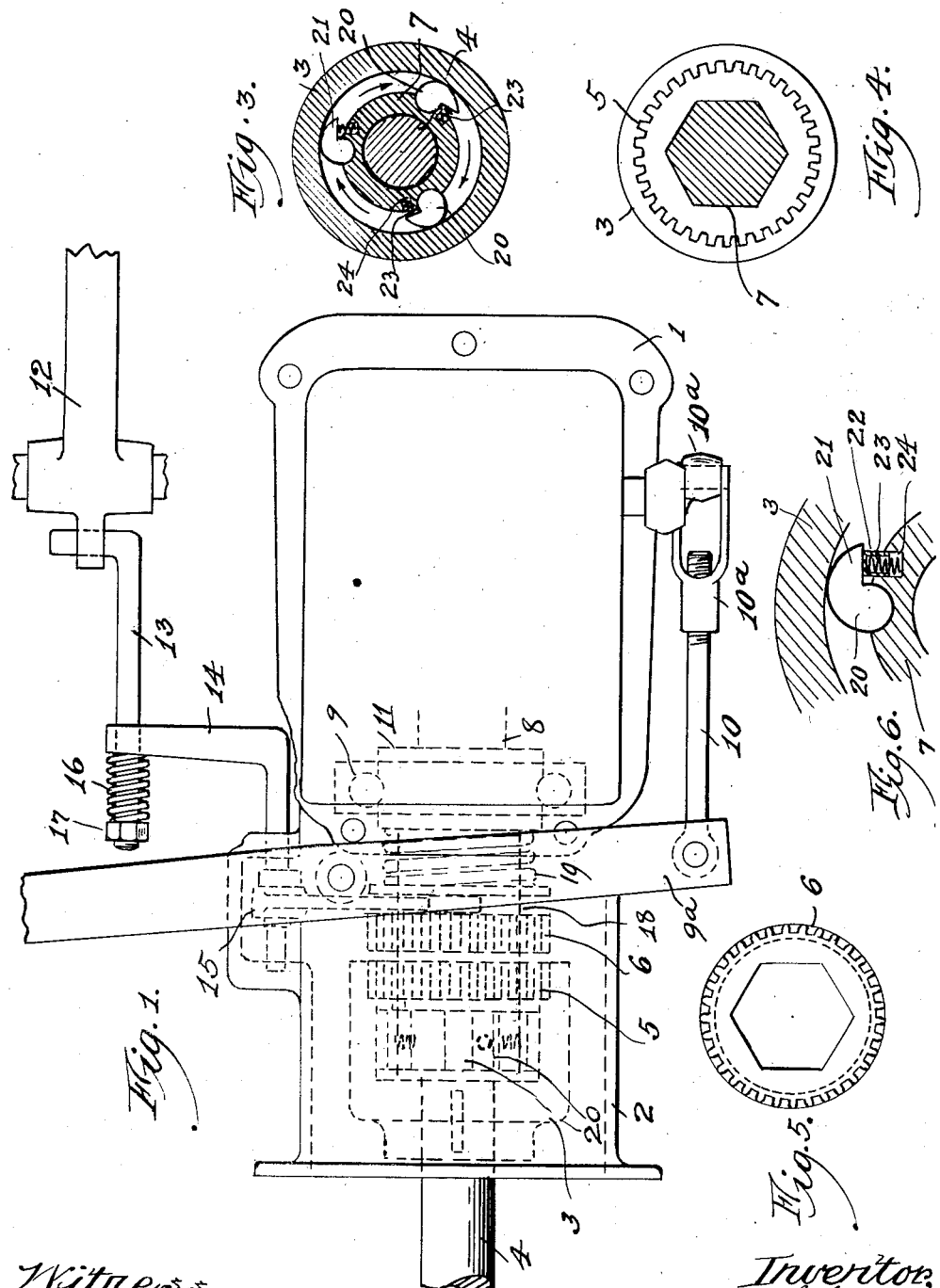
Inventor,
Benjamin F. Schmidt.
By Frank L. Belknap, Atty.
Witness,

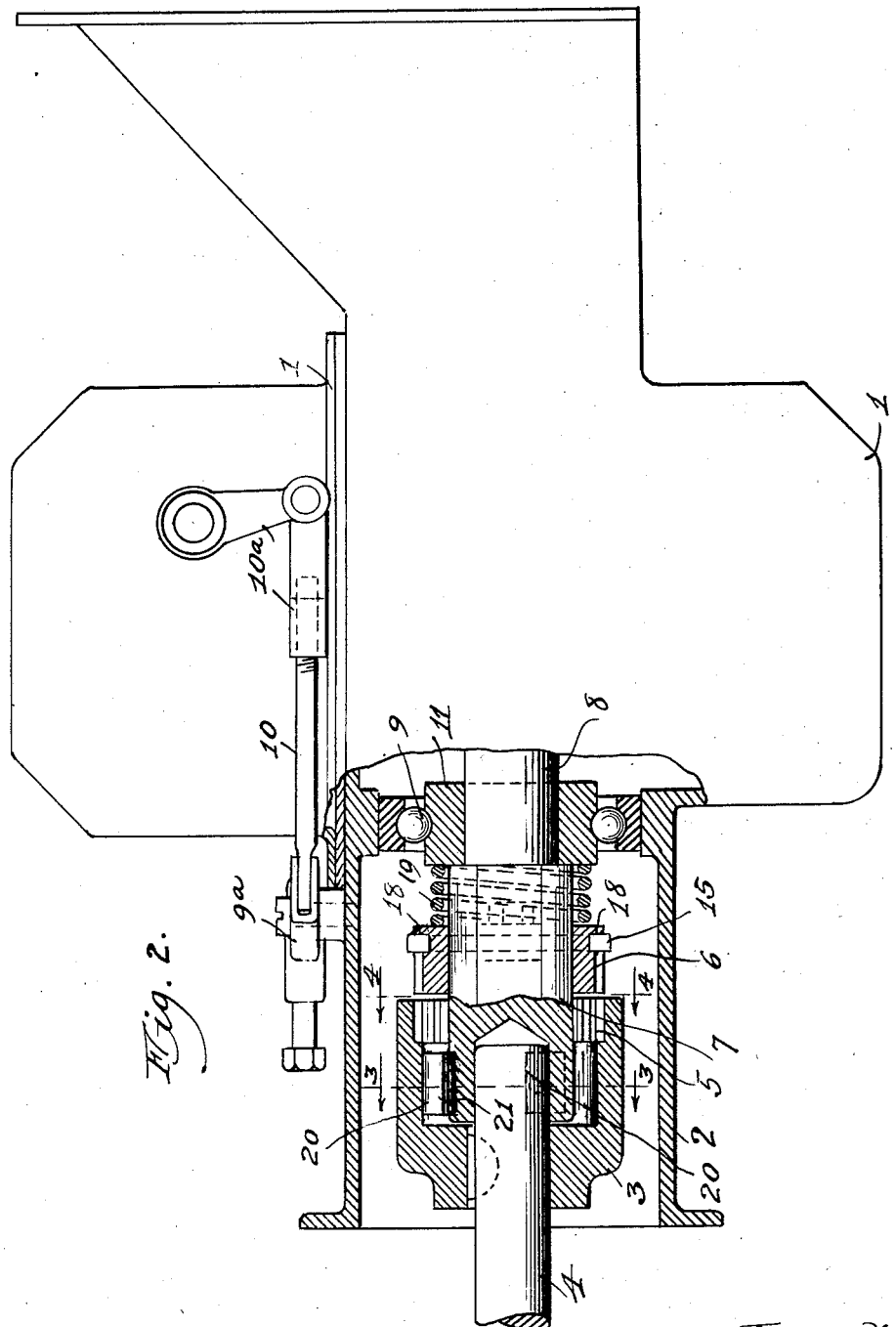

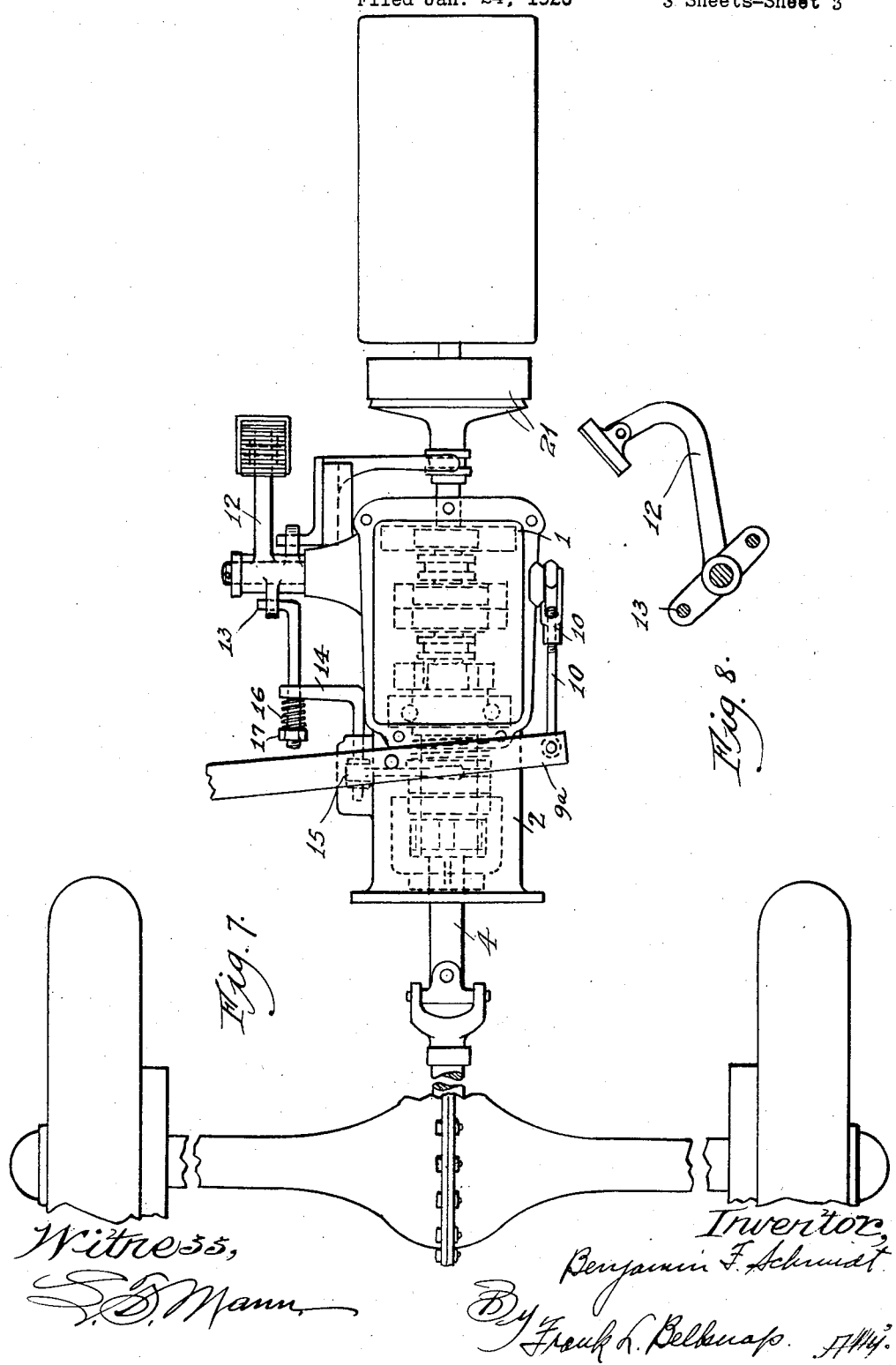

Patented Sept. 21, 1926.

1,600,490

UNITED STATES PATENT OFFICE.

BENJAMIN F. SCHMIDT, OF LOS ANGELES, CALIFORNIA, ASSIGNOR OF ONE-HALF TO KING C. GILLETTE, OF BEVERLY HILLS, CALIFORNIA.

OVERRUNNING CLUTCH WITH INTERNAL SLIDING GEAR.

Application filed January 24, 1920. Serial No. 353,899.

My invention relates to improvements in an over-running clutch, and refers more particularly to a clutch which becomes an overrunning clutch when the main clutch of the car is disengaged and ceases to be an overrunning clutch when the main clutch of the car is engaged.

Among the salient objects of the invention are to provide a clutch which becomes an integral part of the driving mechanism, when the car is being operated through the main drive and remains so until the main clutch is released at which time it becomes an overrunning clutch, allowing the propeller shaft to freely overrun the main drive shaft; to provide a clutch which reduces to a minimum the speed of the gear on the propeller shaft, when the main clutch is released, thereby obviating gear clash; to provide a clutch which gives quicker action in introducing the overrunning element and insures immediate meshing of clutch gears when the main clutch is engaged, besides producing immediate overrunning effect with the release of the main clutch; to provide a clutch in which the travel of the engaging and disengaging members is materially reduced and in general to provide a clutch of the character referred to.

In the drawings:

Fig. 1 is a plan view of the overrunning clutch mechanism with parts omitted.

Fig. 2 is a side elevation of the overrunning clutch with parts broken away and parts omitted.

Fig. 3 is a cross sectional view taken on line 3—3 of Fig. 2 looking in the direction of the arrows.

Fig. 4 is a cross sectional view on line 4—4 of Fig. 2 looking in the direction of the arrows.

Fig. 5 is a detail view of the sliding gear.

Fig. 6 is a detail view of the friction engaging member between the driving and overrunning members.

Fig. 7 is a plan view of a portion of a motor vehicle showing the over-running clutch in place.

Fig. 8 is a detail of the clutch pedal.

Referring in detail to the drawings, the clutch and its appurtenant parts are shown in a very abbreviated manner and only those parts essential to the understanding of my invention, are included. 1 is the transmission case from which the gears have been omitted; 2 is the overrunning clutch case and 3 the overrunning clutch member. This clutch member is keyed to the propeller shaft 4 and has an internal clutch element 5, milled in its hollow forward end. This internal clutch element is engaged and disengaged by sliding clutch element 6, slidably mounted on a driving member 7, and is operated by a shift fork 15 through a series of connections by a foot pedal from the driver's seat.

The driving member 7 is shown hexagonal in shape, through that part of its length on which the clutch element 6 slides, the remaining part being cylindrical in form. The hexagonal shape is arbitrarily chosen, as any shape would suffice which permits the clutch element 6 to slide longitudinally of the shaft and at the same time will withstand the torque strain to which said clutch element is subjected when it is meshed with the internal clutch element of the overrunning member without allowing the same to turn on the shaft. The driving member 7 is fixedly mounted on the rear end of the main drive shaft 8 and extends into the forward end of the clutch member 3 which is itself bored to fit over the end of the propeller shaft 4, and fixed thereto.

The cylindrical portion of the driving member has semi-circular grooves running longitudinally of the driving member and spaced at intervals around its circumference. The cams 20 which have semi-cylindrical bases adapted to bear in the grooves, also have protruding lips which contact spring caps 22, the latter covering springs 23 set in wells 24 in the surface of the driving member 7. The function of these springs is to keep the cams in contact with the overrunning member, the shape of the cams being such that the overruning clutch member 3 may freely overrun the driving member when the main clutch 21 between the engine and the speed change gear set is disengaged but the instant that the main clutch is engaged and the driving member is caused to rotate in the direction shown by the arrows in Fig. 3, the protruding lips on the cams frictionally engage the inner surface of the overrunning clutch member, said lips being pushed up by the springs 23 and thus form a unitary connection between the driving member 7 and the propeller shaft 4. The driving member 7 is fixedly mounted to the main drive shaft which is journalled in the bearing 11 running on balls 9. The bearing 11 is set in the rear of the transmission case, the forward journal together with the forward part of the shaft 8 being omitted from the drawings.

Levers 9ª, connecting link 10 and secondary links 10ª are related to the gear shift mechanism.

The overrunning clutch is operated in combination with the main clutch by a foot pedal, from the floor of the driver's seat in the usual manner. This operation of the foot pedal, through a series of connections pulls forward the lever arm 12, which in turn operates the hook link 13, the right angled connection 14, and the shifting fork 15. A coil spring 16 is held on the hook link 13 by a nut 17 and is compressed with the pushing of the clutch pedal. The shifting fork 15 straddles a channel 18 in the slidable clutch element 6, thereby engaging said clutch element in order to slide it back and forth into and out of mesh with the internal clutch element 5 of the overrunning clutch member. A compression spring 19 is inserted between the bearing 11 and the clutch element 6 and tends to force the clutch element into engagement with the internal clutch element 5.

With the throwing out of the main clutch 21 by pressure on the foot pedal, the shifting fork, through the series of connections previously mentioned, tends to draw the slidable clutch element from its engagement with the internal clutch element in the overrunning clutch member. If there is a driving strain upon the shaft 8, the clutch element 6 will not instantly disengage, and the forward motion of the clutch pedal is then taken up in the spring 16. Immediately on the release of the driving strain due to the throwing out of the main clutch, the coil spring 16 will operate the shift fork and disengage the clutch element 6, even against the compression spring 19. The propeller shaft now being disengaged from the main drive shaft, any overrunning tendency on the part of the propeller shaft will not be transmitted to the drive shaft as the clutch member 3 turns on the drive member 7 due to the cams 20, which compress the springs under their lip portions, permitting the clutch member to rotate freely upon the drive member.

The releasing of the clutch pedal, assisted by the compression spring 19 slides the clutch element 6 into engagement with the clutch element 5. At the same time, the driving member 7 is rigidly held to the overrunning clutch member and propeller shaft, due to the friction cams 20, which are pushed up by the springs beneath their lip portions. It will be noticed that when the main clutch is engaged and the motor is driving through the main drive shaft, the overrunning clutch mechanism is rigidly connected thereto, but when the main clutch is thrown out or released, the clutch member of the overrunning mechanism turns freely upon the driving member.

In shifting gears, it may happen that the slidable clutch element will not be in a proper position to mesh with the internal gear when a shift is made. In that case with the first overrunning effect of the car which will be generally within a few feet of the transmission gear shift, the overrunning clutch member will rotate and the spring 19 will automatically cause the meshing of the slidable clutch element and the internal gear in the overrunning member, thus forming a rigid driving connection to the rear axle. This eliminates all wear, stress or strain on the mechanism of the overrunning clutch and permits the use of the motor compression to control the speed of the car on steep hills or grades.

I claim as my invention:

1. In an over-running clutch for motor vehicles, the combination of: a speed change transmission mechanism; a main clutch for transmitting power to said transmission mechanism; a propeller shaft; an over-running clutch member fixed to said propeller shaft; a driving member in driving relation with said transmission mechanism; intermediate over-running clutch means adapted to automatically establish a one-way driving connection between said over-running clutch member and said driving member and permitting said clutch member to over-run said driving member; a translatable clutch element rotatable with said driving member and operable to unite said over-running clutch member and said driving member against independent rotation; tension means releasable to yieldingly urge said clutch element towards clutching position and to automatically throw in said clutch element when said over-running clutch member and said driving member rotate at substantially the same speed; and a lost-motion operating connection between said clutch element and the main clutch permitting operation of said main clutch at all times, said connection including a tension element operable to overcome the tension of said tension means and disengage said clutch element or to store energy for a subsequent automatic disengagement of said clutch element when relieved of driving strains.

2. An over-running clutch mechanism adapted for incorporation in a motor vehicle having a speed change transmission mechanism, a main clutch for transmitting power to said transmission mechanism and a propeller shaft, said clutch mechanism comprising: an over-running clutch member adapted to be fixed to said shaft; a driving member adapted to be connected in driving relation with said transmission mechanism; intermediate over-running clutch means adapted to automatically establish a one-way driving connection between said over-running clutch member and said driving member and permitting said clutch member to over-run said driving member; a translatable clutch element rotatable with said driving member and operable to unite said over-running clutch member and said driving member against independent rotation; tension means releasable to yieldingly urge said clutch element towards clutching position and to automatically throw in said clutch element when said over-running clutch member and said driving member rotate at substantially the same speed; and a lost-motion operating connection between said clutch element and said main clutch permitting operation of said main clutch at all times, said connection including a tension element operable to overcome the tension of said tension means and disengage said clutch element or to store energy for a subsequent automatic disengagement of said clutch element when relieved of driving strains.

3. In an over-running clutch for motor vehicles, the combination of: a propeller shaft between the transmission and differential mechanisms of said vehicle; an over-running clutch member fixed on said shaft; a driving member in driving relation with the transmission mechanism of said vehicle and provided with means automatically establishing a one-way driving connection with said over-running clutch member upon a predominating driving rotation of said driving member and permitting an over-running of said propeller shaft upon a predominating rotating thereof; a translatable clutch element rotatable with said driving member and operable to establish a positive driving connection between said driving member and said over-running clutch member; a main clutch between the transmission and the power unit of said vehicle; and operating connections between said main clutch and said translatable clutch element and including a lost-motion tension means permitting operation of said main clutch at all times regardless of the position of said clutch element and arranged to pre-tension said clutch element for subsequent automatic operation.

4. An over-running clutch comprising: a driving member; a driven member; intermediate one-way clutch means permitting said driven member to over-run said driving member; a translatable clutch element operable to unite said members independently of said intermediate clutch means; an operating member operable to associate said driving member with a suitable source of power; and lost-motion yielding tension connections between said operating member and said clutch element permitting operation of said operating member at all times regardless of the position of said clutch element and a pre-tensioning of said clutch element for subsequent automatic operation.

5. In an over-running clutch for motor vehicles, the combination of: a speed change transmission mechanism; a main clutch adapted to transmit power to said transmission mechanism; a propeller shaft; an operating member in direct connection with said main clutch; an over-running clutch member fixed on the propeller shaft; a driving member in positive rotative connection with said transmission mechanism; one-way friction clutch means between said driving member and said over-running clutch member; a toothed clutch element slidable on said driving member and rotatably connected thereto, said clutch element being adapted to intermesh with said over-running clutch member; a spring adapted to urge said clutch element to clutching position; means for sliding said clutch element; a lost-motion connection between said clutch sliding means and said main clutch operating member; and a tension element between said connection and said clutch sliding means.

6. In an over-running clutch, the combination of: a driving member; a driven member; intermediate over-running clutch means adapted to automatically establish a one-way driving connection between said members and permitting said driven member to over-run said driving member; a translatable clutch element rotatable with said driving member and operable to unite said driving and driven members against independent rotation; tension means releasable to yieldingly urge said clutch element towards clutching position and to automatically throw in said clutch element when said driving and driven members rotate at substantially the same speed; and an operating connection associated with said clutch element, said connection including a tension element operable to overcome the tension of said tension means and disengage said clutch element or to store energy for a subsequent automatic disengagement of said clutch element when relieved of driving strains.

BENJAMIN F. SCHMIDT.